United States Patent
Lu et al.

(10) Patent No.: US 10,495,942 B2
(45) Date of Patent: Dec. 3, 2019

(54) LIQUID CRYSTAL PRISM, METHOD FOR DRIVING THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xue Dong, Beijing (CN); Xiaochuan Chen, Beijing (CN); Qian Wang, Beijing (CN); Wenqing Zhao, Beijing (CN); Jian Gao, Beijing (CN); Ming Yang, Beijing (CN); Lei Wang, Beijing (CN); Rui Xu, Beijing (CN); Xiaochen Niu, Beijing (CN); Haisheng Wang, Beijing (CN); Shengji Yang, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,623

(22) PCT Filed: Jul. 13, 2016

(86) PCT No.: PCT/CN2016/089910
§ 371 (c)(1),
(2) Date: Jun. 29, 2017

(87) PCT Pub. No.: WO2017/173742
PCT Pub. Date: Oct. 12, 2017

(65) Prior Publication Data
US 2019/0033681 A1    Jan. 31, 2019

(30) Foreign Application Priority Data

Apr. 6, 2016    (CN) .......................... 2016 1 0210188

(51) Int. Cl.
*G02B 27/22* (2018.01)
*G02F 1/29* (2006.01)
(Continued)

(52) U.S. Cl.
CPC ........... *G02F 1/29* (2013.01); *G02B 27/2214* (2013.01); *G06F 3/013* (2013.01);
(Continued)

(58) Field of Classification Search
CPC .... G02F 1/29; G02F 2203/24; G02F 2201/12; G06F 3/013; G06K 9/00228; G02B 27/2214
See application file for complete search history.

(56) References Cited

U.S. PATENT DOCUMENTS

2010/0157026 A1    6/2010   Reichelt
2013/0169704 A1    7/2013   Tanaka et al.
(Continued)

FOREIGN PATENT DOCUMENTS

CN    103176308 A    6/2013
CN    104035203 A    9/2014
(Continued)

OTHER PUBLICATIONS

Translation of CN104035203. Feb. 2019.*
(Continued)

*Primary Examiner* — Phu Vu
(74) *Attorney, Agent, or Firm* — Brooks Kushman P.C.

(57) ABSTRACT

The present application provides a liquid crystal prism including a first substrate, a second substrate, a liquid crystal layer arranged between the first substrate and the second
(Continued)

substrate, a face recognition circuit, a prism form determination circuit and a control circuit. The liquid crystal prism is divided into a plurality of prism units. The face recognition circuit is configured to acquire eye position information from one or more faces, and transmit the eye position information to the prism form determination circuit. The prism form determination circuit is configured to determine a prism form in accordance with a correspondence mapping table about correspondences between eye position information and prism forms, and the eye position information acquired by the face recognition circuit. The control circuit is configured to control voltages applied to the strip-like electrodes of the prism units in accordance with the prism form determined by the prism form determination circuit.

18 Claims, 5 Drawing Sheets

(51) Int. Cl.
*G06F 3/01* (2006.01)
*G06K 9/00* (2006.01)
(52) U.S. Cl.
CPC ...... *G06K 9/00228* (2013.01); *G02F 2201/12* (2013.01); *G02F 2203/24* (2013.01)

(56) References Cited

U.S. PATENT DOCUMENTS

2015/0338670 A1 11/2015 Hayashi et al.
2018/0107088 A1* 4/2018 Wang ..................... G02F 1/29

FOREIGN PATENT DOCUMENTS

| CN | 104969121 A | 10/2015 |
| CN | 105629621 A | 6/2016 |
| KR | 20150069588 A | 6/2015 |
| WO | 2008142156 A1 | 11/2008 |

OTHER PUBLICATIONS

First Office Action for Chinese Application No. 201610210188.1, dated Jun. 2, 2017, 6 Pages.
International Search Report and Written Opinion for Application No. PCT/CN2016/089910, dated Jan. 5, 2017, 10 Pages.
Second Office Action for Chinese Application No. 201610210188.1, dated Oct. 9, 2017, 4 Pages.

* cited by examiner

LIQUID CRYSTAL PRISM, METHOD FOR DRIVING THE SAME, AND DISPLAY DEVICE

CROSS-REFERENCE TO RELATED APPLICATIONS

This application is the U.S. national phase of PCT Application No. PCT/CN2016/089910 filed on Jul. 13, 2016, which claims priority to Chinese Patent Application No. 201610210188.1 filed on Apr. 6, 2016, the disclosures of which are incorporated in their entirety by reference herein.

TECHNICAL FIELD

The present disclosure relates to the field of display technology, in particular to a liquid crystal prism, a method for driving the liquid crystal prism, and a display device.

BACKGROUND

For a stereoscopic display technology, i.e., a three-dimensional (3D) display technology, two images of an identical object at different viewing points may be acquired in accordance with a person's visual sense, and received by a left eye and a right eye of the person respectively. Then, the left-eye image and the right-eye image may be combined within the brain with binocular parallax, so as to generate a depth sense, i.e., to provide a stereo display effect.

In the related art, the 3D display technologies mainly include a glass-type 3D display technology and a glassless 3D display technology. For the former, a special pair of glasses needs to be provided, so it cannot be used by a portable device conveniently. Actually, the glassless 3D display technology is mainly used in a mobile electronic product.

As one implementation mode, a liquid crystal prism may include a first substrate, a second substrate, and a liquid crystal layer arranged between the first substrate and the second substrate. A plurality of electrode groups is arranged on the second substrate at a side close to the liquid crystal layer. Each electrode group includes a plurality of strip-like electrodes, and different voltages are applied to the different strip-like electrodes, so as to form a gradient electric field. At this time, different electric field forces are applied to liquid crystals at different positions, so the liquid crystals are rotated in different directions, thereby to achieve an effect of the liquid crystal prism. In other words, a plurality of prism units is formed by the plurality of electrode groups, so as to achieve the glassless 3D display effect. However, in the related art, usually the liquid crystal prism is merely suitable for one viewer rather than a plurality of viewers, and a viewing angle is limited.

SUMMARY

An object of the present disclosure is to provide a liquid crystal prism suitable for a single viewer or a plurality of viewers, a method for driving the liquid crystal prism and a display device, so as to solve the above-mentioned defects.

In one aspect, the present disclosure provides in some embodiments a liquid crystal prism, including a first substrate, a second substrate, and a liquid crystal layer arranged between the first substrate and the second substrate. The liquid crystal prism is divided into a plurality of prism units, and strip-like electrodes are each arranged on the first substrate or the second substrate at a side adjacent to the liquid crystal layer and at a position corresponding to each prism unit. The liquid crystal prism further includes a face recognition circuit, a prism form determination circuit and a control circuit. The face recognition circuit is configured to acquire eye position information from one or more faces, and transmit the eye position information to the prism form determination circuit. The prism form determination circuit is configured to determine a prism form in accordance with a correspondence mapping table about correspondences between eye position information and prism forms, and the eye position information acquired by the face recognition circuit, and the correspondence mapping table is pre-stored in the prism form determination circuit. The control circuit is configured to control voltages applied to the strip-like electrodes of the prism units in accordance with the prism form determined by the prism form determination circuit, so as to enable liquid crystal molecules in the liquid crystal layer to constitute the corresponding prism form.

In a possible embodiment of the present disclosure, the face recognition circuit includes a face determination circuit and an eye tracking circuit. The face determination circuit is configured to detect face information and determine the number of viewers. The eye tracking circuit is configured to detect the eye position information about each viewer determined by the face determination circuit, and transmit the eye position information about each viewer to the prism form determination circuit.

In a possible embodiment of the present disclosure, the liquid crystal prism further includes a liquid crystal high-frequency driving unit configured to provide a corresponding refresh rate for the liquid crystal prism in accordance with the number of the viewers determined by the face determination circuit.

In a possible embodiment of the present disclosure, the strip-like electrodes are arranged on one of the first substrate and the second substrate at a side adjacent to the liquid crystal layer, and plate-like electrodes are arranged on the other of the first substrate and the second substrate at a side adjacent to the liquid crystal layer.

In a possible embodiment of the present disclosure, the prism form includes each triangle formed by every two adjacent prism units.

In another aspect, the present disclosure provides in some embodiments a method for driving the above-mentioned liquid crystal prism, including steps of: acquiring eye position information from one or more faces; determining a prism form in accordance with a pre-stored correspondence mapping table about correspondences between eye position information and prism forms, and the acquired eye position information; and controlling voltages applied to the strip-like electrodes of the prism units in accordance with the determined prism form, to enable liquid crystal molecules in a liquid crystal layer to constitute the corresponding prism form.

In a possible embodiment of the present disclosure, the step of acquiring the eye position information from the one or more faces includes: detecting face information and determining the number of viewers, and detecting the eye position information about each of the determined viewers.

In a possible embodiment of the present disclosure, the method further includes providing a corresponding refresh rate for the liquid crystal prism in accordance with the number of the determined viewers.

In yet another aspect, the present disclosure provides in some embodiments a display device including the above-mentioned liquid crystal prism.

In a possible embodiment of the present disclosure, the display device further includes a backlight source arranged at a light-entering side of the liquid crystal prism.

In a possible embodiment of the present disclosure, the display device further includes a polarizer arranged at a light-entering side of the second substrate, and a splitter film arranged between the backlight source and the polarizer.

In the liquid crystal prism according to the embodiments of the present disclosure, the face recognition circuit may detect an eye position, the prism form determination circuit may determine the prism form corresponding to the eye position, and then the control circuit may adjust the prism form of each prism unit, so as to enable each viewer to receive accurate light beams. Hence, it is able to provide a more intelligent liquid crystal prism.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

Figure 1:
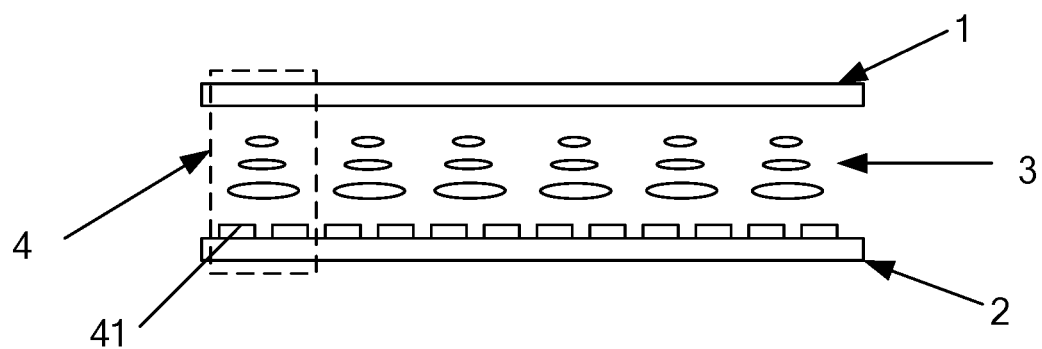
FIG. 1 is a schematic view showing a liquid crystal prism according to some embodiments of the present disclosure.

REFERENCE SIGN LIST 1 first substrate
2 second substrate
3 liquid crystal layer
4 prism unit
41 strip-like electrode
5 face recognition circuit
6 prism form determination circuit
7 control circuit
8 polarizer
9 splitter film
10 backlight source

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 2:
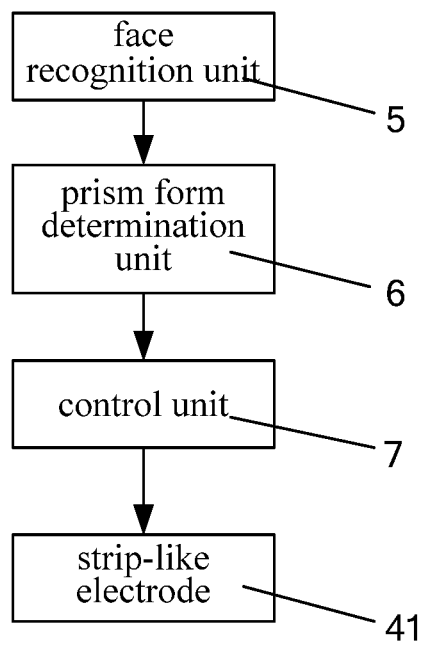
FIG. 2 is a block diagram of the liquid crystal prism according to some embodiments of the present disclosure.

As shown in FIGS. 1 and 2, the present disclosure provides in some embodiments a liquid crystal prism, including a first substrate 1, a second substrate 2, and a liquid crystal layer 3 arranged between the first substrate 1 and the second substrate 2. The liquid crystal prism is divided into a plurality of prism units 4, and strip-like electrodes 41 are each arranged on the second substrate 2 at a side adjacent to the liquid crystal layer 3 and at a position corresponding to each prism unit 4. A voltage applied to each strip-like electrode may be adjusted, so as to form a gradient electric field, thereby to enable each prism unit 4 to be in a special prism form. To be specific, in some embodiments of the present disclosure, the liquid crystal prism further includes a face recognition circuit 5, a prism form determination circuit 6 and a control circuit 7. The face recognition circuit 5 is configured to acquire eye position information from one or more faces, and transmit the eye position information to the prism form determination circuit 6. The prism form determination circuit 6 is configured to determine a prism form in accordance with a correspondence mapping table about correspondences between eye position information and prism forms, and the eye position information acquired by the face recognition circuit 5, and the correspondence mapping table is pre-stored in the prism form determination circuit 6. The control circuit 7 is configured to control voltages applied to the strip-like electrodes 41 of the prism units 4 in accordance with the prism form determined by the prism form determination circuit 6, so as to enable liquid crystal molecules in the liquid crystal layer 3 to constitute the corresponding prism form.

It should be appreciated that, the above-mentioned mapping table is pre-stored in the prism form determination circuit, i.e., the prism form determination circuit includes a storage module in which the mapping table is stored.

In some embodiments of the present disclosure, an eye position may be detected by the face recognition circuit 5, the prism form corresponding to the eye position may be determined by the prism form determination circuit 6, and then the prism form of each prism unit 4 may be adjusted by the control circuit 7, so as to enable each viewer to receive accurate light beams. Hence, it is able to provide a more intelligent liquid crystal prism.

In some embodiments of the present disclosure, the face recognition circuit 5 includes a face determination circuit and an eye tracking circuit. The face determination circuit is configured to detect face information and determine the number of viewers. The eye tracking circuit is configured to detect the eye position information about each viewer determined by the face determination circuit, and transmit the eye position information about each viewer to the prism form determination circuit 6.

Figure 3:
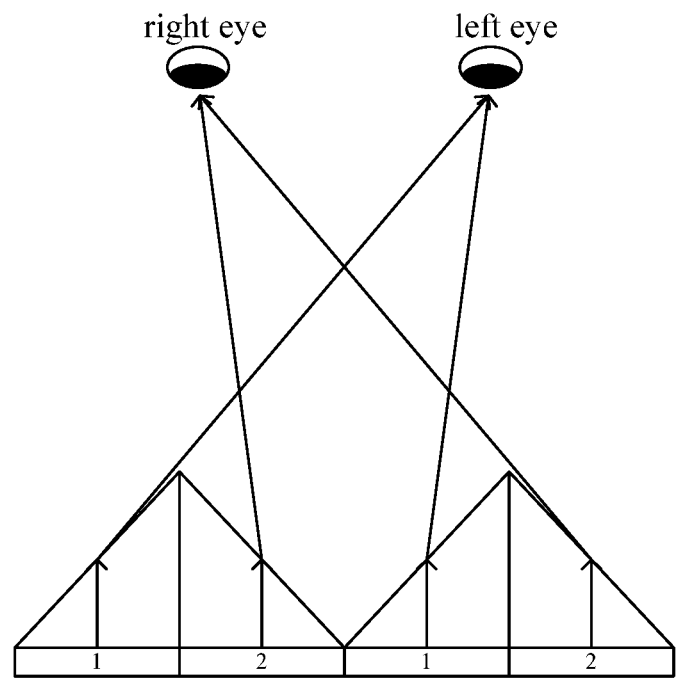
FIG. 3 is a schematic view showing prism forms of the liquid crystal prism in the case of one viewer according to some embodiments of the present disclosure.
Figure 4:
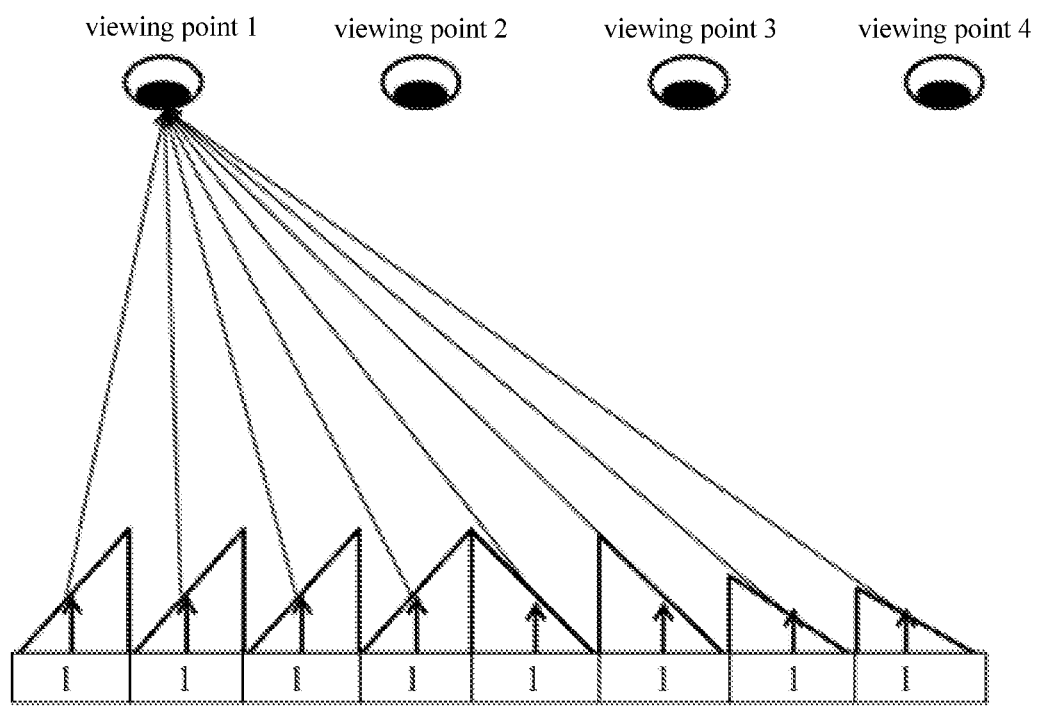
FIGS. 4-7 are schematic views showing the prism forms of the liquid crystal prism in the case of two viewers (i.e., 4 viewing points) according to some embodiments of the present disclosure.
Figure 5:
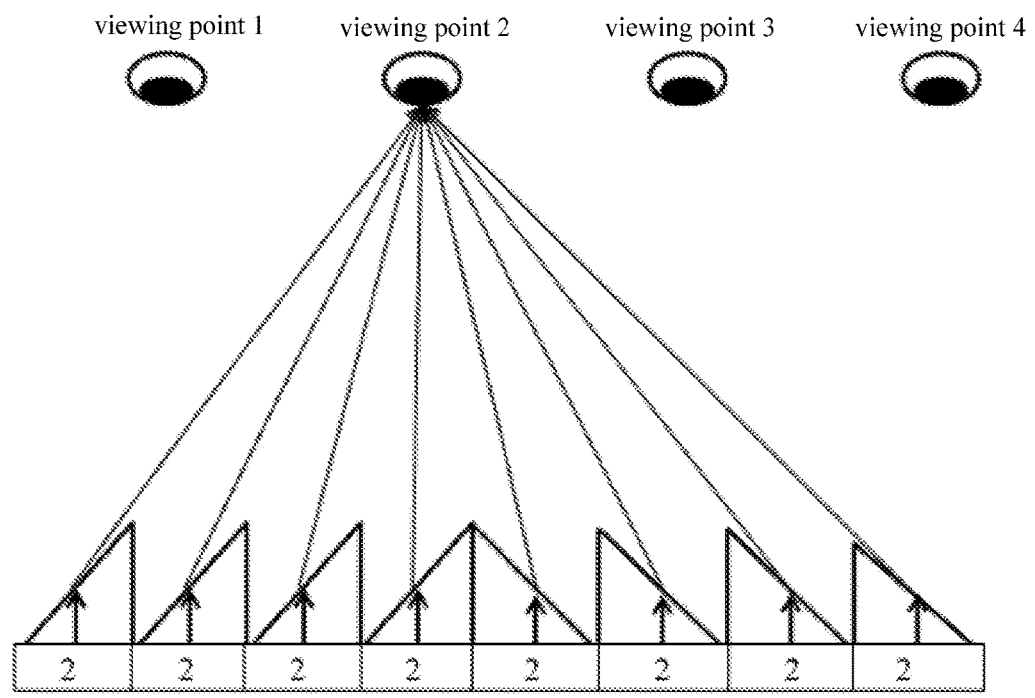
Figure 6:
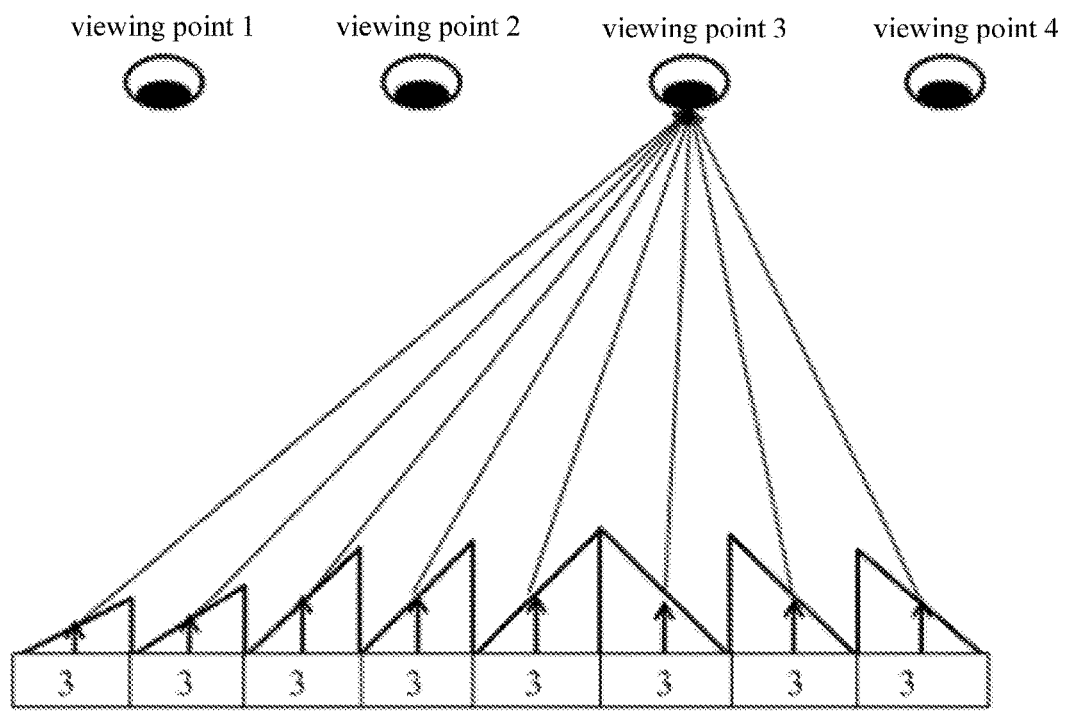
Figure 7:
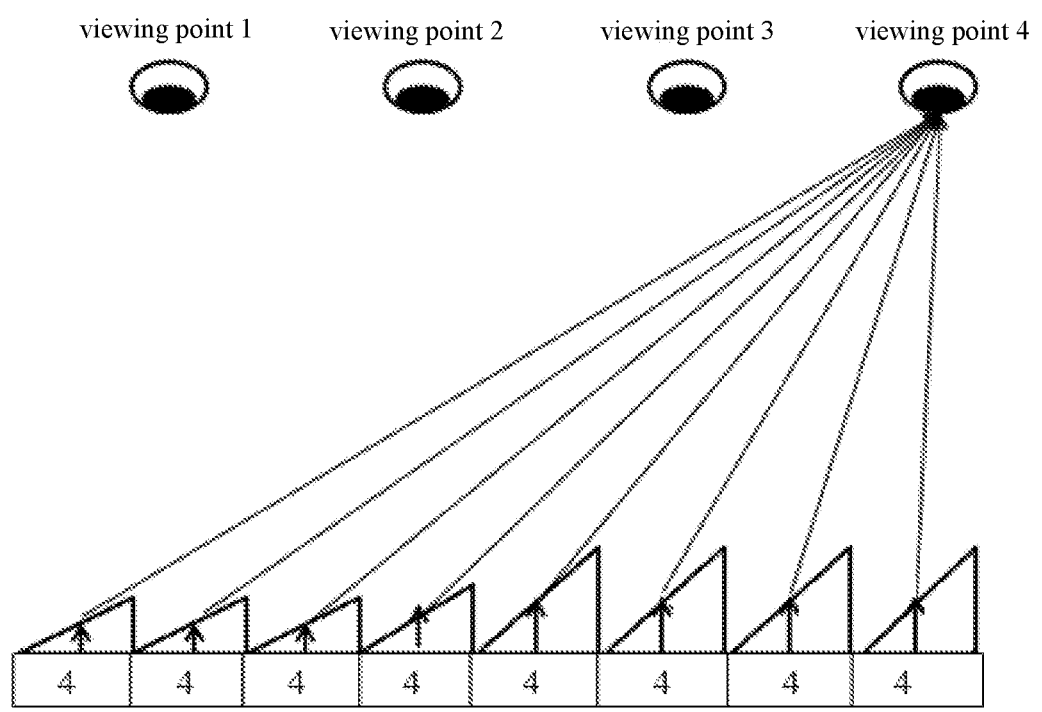

To be specific, in the case that the face determination circuit has detected the face information and determined that the number of the viewers is 1, the eye tracking circuit may transmit the eye position information of the viewer to the prism form determination circuit 6. At this time, the prism form determination circuit 6 may determine, in accordance with the mapping table stored therein, the prism form through which the viewer is capable of viewing an image. FIG. 3 shows the prism form, i.e., every two adjacent prism units 4 form a triangle, where signs "1" correspond to a left eye, and signs "2" correspond to a right eye. In this way, it is able to achieve a 3D display effect for a single viewer.

As shown in FIGS. 4-7, in the case that the face determination circuit has detected the face information and determined that there is more than one viewer, the eye tracking circuit may transmit the eye position information about the multiple viewers to the prism form determination circuit 6. At this time, the prism formation determination circuit 6 may determine, in accordance with the mapping table stored therein, the prism forms through which the multiple viewers are capable of viewing the images. At this time, the control circuit 7 may control the voltages applied to the strip-like electrodes 41 of the prism units 4 sequentially, so as to enable the prism units 4 to be sequentially in the prism forms corresponding to the eye positions of the multiple viewers. For example, it may be sequentially generated a prism form corresponding to a left eye of a first viewer, a prism form corresponding to a right eye of the first viewer, a prism form corresponding to a left eye of a second viewer, a prism form corresponding to a right eye of the second viewer, and so on, so as to provide the 3D display effect for the multiple viewers.

Further, regardless of the 3D display for the single viewer or the multiple viewers, in the case of scanning at a refresh rate for displaying a two-dimensional (2D) image in the related art, a resolution of a 3D image may be decreased. Hence, in some embodiments of the present disclosure, the liquid crystal prism may further include a liquid crystal high-frequency driving unit configured to provide a corresponding high-frequency refresh rate for the liquid crystal prism in accordance with the number of the viewers determined by the face determination circuit.

For example, when the refresh rate for displaying a 2D image is 60 Hz, the refresh rates for the left-eye image and the right-eye image are both 60 Hz in the case of displaying a 3D image for a single viewer. At this time, in the case of viewing the 3D image, the refresh rate is 30 Hz, i.e., a resolution of the 3D image is decreased obviously. In some embodiments of the present disclosure, through the liquid crystal high-frequency driving unit, it is able to increase the refresh rate of the liquid crystal prism (e.g., to increase the refresh rates for the left-eye image and the right-eye image both to be 120 Hz, and at this time, the refresh rate for viewing the 3D image is 60 Hz), thereby to display the image at a full resolution for the single viewer.

Similarly, when the refresh rate for displaying a 2D image is 60 Hz and there is more than one viewer, e.g., two viewers (including four viewing points, i.e., viewing point 1, viewing point 2, viewing point 3 and the viewing point 4), the refresh rates for the left-eye images and the right-eye images are all 60 Hz in the case of displaying a 3D image for the two viewers. At this time, in the case of viewing the 3D image, the refresh rate for each viewer is 15 Hz, i.e., the resolution of the image is decreased obviously. In some embodiments of the present disclosure, through the liquid crystal high-frequency driving unit, it is able to increase the refresh rate of the liquid crystal prism (e.g., to increase the refresh rate for the left-eye images and the right-eye images to 240 Hz with respect to the two viewers (including four viewing points, i.e., viewing point 1, viewing point 2, viewing point 3 and viewing point 4), and at this time, the refresh rate for the viewers to view the 3D image is 60 Hz), thereby to display the image at a full resolution for the multiple viewers.

In each prism unit 4, through the gradient electric field formed due to the strip-like electrodes 41 on the second substrate 2, it is able to generate the corresponding prism form. Alternatively, the strip-like electrodes 41 may also be arranged on the first substrate 1; or plate-like electrodes may be formed on the first substrate 1 and the strip-like electrodes 41 may be formed on the second substrate 2; or the strip-like electrodes 41 may be formed on the first substrate 1 and the plate-like electrodes may be formed on the second substrate 2. Of course, regardless of the arrangement modes of the electrodes, it is able to adjust the voltages applied to the strip-like electrodes 41, so as to control the prism form of each prism unit 4.

Figure 8:
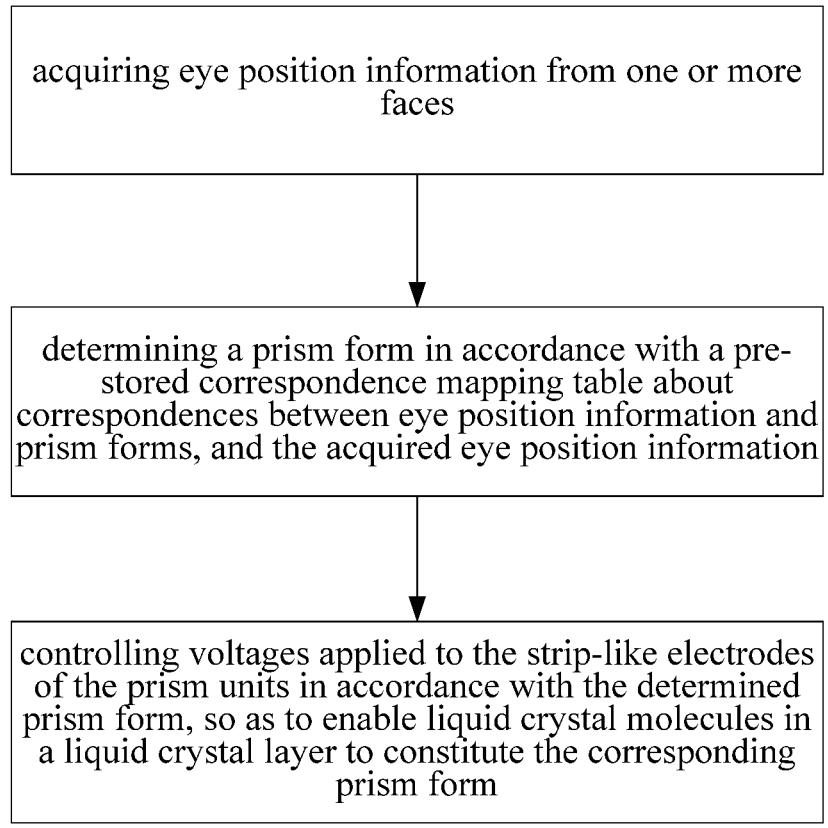
FIG. 8 is a flow chart showing a method for driving the liquid crystal prism according to some embodiments of the present disclosure.

As shown in FIG. 8, the present disclosure provides in some embodiments a method for driving the above-mentioned liquid crystal prism as shown in FIGS. 1-7, which includes the following steps.

Step 1: acquiring eye position information from the one or more faces. The eye position information in the face may be detected by the face recognition circuit 5.

Step 1 may include: detecting the face information and determining the number of the viewers; and detecting the eye position information about each of the determined viewers.

To be specific, the face determination circuit of the face recognition circuit 5 may detect the face information and determine the number of the viewers. Then, the eye tracking circuit of the face recognition circuit 5 may detect the eye position information about each of the viewers determined by the face determination circuit, and transmit the eye position information of each viewer to the prism form determination circuit 6.

Step 2: determining the prism form in accordance with the pre-stored correspondence mapping table about the correspondence between the eye position information and the prism forms, and the acquired eye position information.

Step 2 may include determining, by the prism form determination circuit 6, the prism form in accordance with the correspondence mapping table about the pre-stored correspondence between the eye position information and the prism forms, and the eye position information acquired by the face recognition circuit 5.

Step 3: controlling the voltages applied to the strip-like electrodes 41 of the prism units 4 in accordance with the determined prism form, so as to enable liquid crystal molecules in the liquid crystal layer 3 to constitute the corresponding prism form.

Step 3 may include controlling, by the control circuit 7, the voltages applied to the strip-like electrodes 41 of the prism units 4 in accordance with the prism form determined by the prism form determination circuit 6, so as to enable liquid crystal molecules in the liquid crystal layer 3 to constitute the corresponding prism form.

For example, in the case that the face determination circuit has detected the face information and determined that the number of the viewers is 1, the eye tracking circuit may transmit the eye position information of the viewer to the prism form determination circuit 6. At this time, the prism form determination circuit 6 may determine, in accordance with the mapping table stored therein, the prism form through which the viewer is capable of viewing an image. FIG. 3 shows the prism form, i.e., every two adjacent prism units 4 form a triangle, where signs "1" correspond to a left eye, and signs "2" correspond to a right eye. In this way, it is able to achieve a 3D display effect for a single viewer.

In the case that the face determination circuit has detected the face information and determined that there is more than one viewer, the eye tracking circuit may transmit the eye position information about the multiple viewers to the prism form determination circuit 6. At this time, the prism formation determination circuit 6 may determine, in accordance with the mapping table stored therein, the prism forms through which the multiple viewers are capable of viewing the images. At this time, the control circuit 7 may control the voltages applied to the strip-like electrodes 41 of the prism units 4 sequentially, so as to enable the prism units 4 to be sequentially in the prism forms corresponding to the eye positions of the multiple viewers. For example, it may be sequentially generated a prism form corresponding to a left eye of a first viewer, a prism form corresponding to a right eye of the first viewer, a prism form corresponding to a left eye of a second viewer, a prism form corresponding to a right eye of the second viewer, and so on, so as to provide the 3D display effect for the multiple viewers. FIGS. 4-7 show the prism forms for four viewing points (viewing points 1 to 4), i.e., two viewers, respectively.

Further, regardless of the 3D display for the single viewer or the multiple viewers, in the case of scanning at a refresh rate for displaying a 2D image in the related art, a resolution of a 3D image may be decreased. Hence, in some embodiments of the present disclosure, the method may further include providing a corresponding high-frequency refresh rate for the liquid crystal prism in accordance with the number of the determined viewers. This step may be performed between Step 1 and Step 2, or between Step 2 and Step 3, or subsequent to Step 3.

For example, when the refresh rate for displaying a 2D image is 60 Hz, the refresh rates for the left-eye image and the right-eye image are both 60 Hz in the case of displaying a 3D image for a single viewer. At this time, in the case of viewing the 3D image, the refresh rate is 30 Hz, i.e., a resolution of the 3D image may be decreased obviously. In some embodiments of the present disclosure, through the liquid crystal high-frequency driving unit, it is able to increase the refresh rate of the liquid crystal prism. For example, when the refresh rate for displaying a 2D image is 60 Hz, the refresh rates for the left-eye image and the right-eye image are both 60 Hz in the case of displaying a 3D image for a single viewer. At this time, in the case of viewing the 3D image, the refresh rate is 30 Hz, i.e., a resolution of the 3D image may be decreased obviously. In some embodiments of the present disclosure, through the liquid crystal high-frequency driving unit, it is able to increase the refresh rate of the liquid crystal prism (e.g., to increase the refresh rates for the left-eye image and the right-eye image both to be 120 Hz, and at this time, the refresh rate for viewing the 3D image is 60 Hz), thereby to display the image at a full resolution for the single viewer.

Similarly, when the refresh rate for displaying a 2D image is 60 Hz and there is more than one viewer, e.g., two viewers (including four viewing points, i.e., viewing point 1, viewing point 2, viewing point 3 and the viewing point 4), the refresh rate for the left-eye images and the right-eye images may be increased to 240 Hz with respect to the two viewers, and at this time, the refresh rate for viewing the 3D image is 60 Hz, so as to display the image at a full resolution for the multiple viewers. The images corresponding to the viewing points 1 to 4 may be driven sequentially each for a time period of $\frac{1}{240}$s. Of course, the images corresponding to these viewing points may also be driven in any other order.

Figure 9:
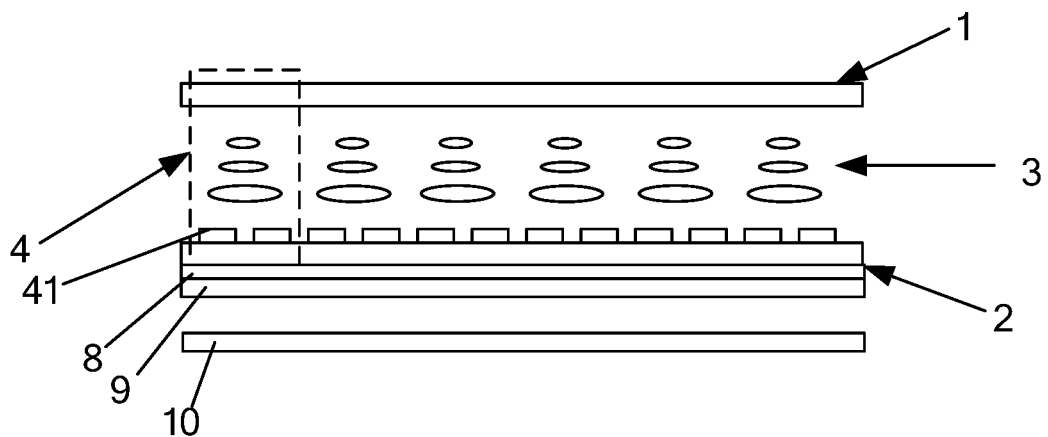
FIG. 9 is a schematic view showing a display device according to some embodiments of the present disclosure.

As shown in FIG. 9, the present disclosure further provides in some embodiments a display device including the above-mentioned liquid crystal prism as shown in FIGS. 1-7. The liquid crystal prism may also function as a display panel. Through the adjustment on the voltages applied to the strip-like electrodes 41, it is able to constitute the prism forms and meanwhile display the images at different grayscale values.

The display device may further includes a backlight source 10 arranged at a light-entering side of the liquid crystal prism, a polarizer 8 (a lower polarizer) arranged at a light-entering side of the second substrate 2, and a splitter film 9 arranged between the backlight source 10 and the polarizer 8.

After passing through the splitter film 9, a light beam from the backlight source 10 may be split into three light beams in red, green and blue respectively, which are then transmitted through the lower polarizer and the liquid crystal prism, so as to display an image. Obviously, in some embodiments of the present disclosure, it is unnecessary to provide a color filter and an upper polarizer for the display device, so it is able to provide a thin and light display device.

In some embodiments of the present disclosure, the display device may be any product or member having a display function, e.g., a liquid crystal panel, an electronic paper, a mobile phone, a flat-panel computer, a television, a display, a laptop computer, a digital photo frame or a navigator.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A liquid crystal prism, comprising a first substrate, a second substrate, a liquid crystal layer arranged between the first substrate and the second substrate, a face recognition circuit, a prism form determination circuit, a control circuit, and a liquid crystal high-frequency driving unit, wherein
   the liquid crystal prism is divided into a plurality of prism units;
   strip-like electrodes are each arranged on the first substrate or the second substrate at a side adjacent to the liquid crystal layer and at a position corresponding to each of the prism unit;
   the face recognition circuit is configured to acquire eye position information from one or more faces, and transmit the eye position information to the prism form determination circuit, wherein the face recognition circuit comprises a face determination circuit configured to detect face information and determine the number of viewers;
   the prism form determination circuit is configured to determine a prism form in accordance with a correspondence mapping table about correspondences between eye position information and prism forms, and the eye position information acquired by the face recognition circuit, and the correspondence mapping table is pre-stored in the prism form determination circuit;

the control circuit is configured to control voltages applied to the strip-like electrodes of the prism units in accordance with the prism form determined by the prism form determination circuit, to enable liquid crystal molecules in the liquid crystal layer to constitute the corresponding prism form; and the liquid crystal high-frequency driving unit is configured to provide a corresponding refresh rate for the liquid crystal prism in accordance with the number of the viewers determined by the face determination circuit, wherein in the case that the face determination circuit has determined that there are multiple viewers, the control circuit is further configured to control the voltages applied to the strip-like electrodes of the prism units sequentially, to enable the prism units to be sequentially in each of the prism forms corresponding to the eye positions of the respective multiple viewers.

2. The liquid crystal prism according to claim 1, wherein the face recognition circuit further comprises an eye tracking circuit; and the eye tracking circuit is configured to detect the eye position information about each of the viewers determined by the face determination circuit, and transmit the eye position information about each viewer to the prism form determination circuit.

3. The liquid crystal prism according to claim 1, wherein the strip-like electrodes are arranged on one of the first substrate and the second substrate at a side adjacent to the liquid crystal layer, and plate-like electrodes are arranged on the other of the first substrate and the second substrate at a side adjacent to the liquid crystal layer.

4. The liquid crystal prism according to claim 1, wherein the prism form comprises each triangle formed by every two adjacent prism units.

5. A method for driving the liquid crystal prism according to claim 1, comprising:

acquiring eye position information from one or more faces;

determining a prism form in accordance with a pre-stored correspondence mapping table about correspondences between eye position information and prism forms, and the acquired eye position information; and controlling voltages applied to the strip-like electrodes of the prism units in accordance with the determined prism form, to enable liquid crystal molecules in a liquid crystal layer to constitute the corresponding prism form.

6. The method according to claim 5, wherein acquiring the eye position information from the one or more faces comprises: detecting face information and determining the number of viewers, and detecting the eye position information about each of the determined viewers.

7. The method according to claim 6, further comprising providing a corresponding high refresh rate for the liquid crystal prism in accordance with the number of the determined viewers.

8. A display device, comprising the liquid crystal prism according to claim 1.

9. The display device according to claim 8, further comprising a backlight source arranged at a light-entering side of the liquid crystal prism.

10. The display device according to claim 9, further comprising a polarizer arranged at a light-entering side of the second substrate, and a splitter film arranged between the backlight source and the polarizer.

11. The display device according to claim 8, wherein the face recognition circuit further comprises an eye tracking circuit; and the eye tracking circuit is configured to detect the eye position information about each of the viewers determined by the face determination circuit, and transmit the eye position information about each viewer to the prism form determination circuit.

12. The display device according to claim 8, wherein the strip-like electrodes are arranged on one of the first substrate and the second substrate at a side adjacent to the liquid crystal layer, and plate-like electrodes are arranged on the other of the first substrate and the second substrate at a side adjacent to the liquid crystal layer.

13. The display device according to claim 8, wherein the prism form comprises each triangle formed by every two adjacent prism units.

14. The display device according to claim 11, further comprising a backlight source arranged at a light-entering side of the liquid crystal prism.

15. The display device according to claim 14, further comprising a polarizer arranged at a light-entering side of the second substrate, and a splitter film arranged between the backlight source and the polarizer.

16. The display device according to claim 11, further comprising a backlight source arranged at a light-entering side of the liquid crystal prism.

17. The display device according to claim 16, further comprising a polarizer arranged at a light-entering side of the second substrate, and a splitter film arranged between the backlight source and the polarizer.

18. The display device according to claim 12, further comprising a backlight source arranged at a light-entering side of the liquid crystal prism.

* * * * *